United States Patent Office 3,090,787
Patented May 21, 1963

3,090,787
ISOQUINUCLIDINE ALKALOID AND THE
PRODUCTION THEREOF
Ulrich Renner, Riehen, near Basel, and Daniel A. Prins,
Oberwil, Basel-Land, Switzerland, assignors to Geigy
Chemical Corporation, Ardsley, N.Y., a corporation of
Delaware
No Drawing. Filed Mar. 4, 1960, Ser. No. 12,699
Claims priority, application Switzerland Mar. 5, 1959
7 Claims. (Cl. 260—294.3)

The present invention concerns a process for the obtention of a new isoquinuclidine alkaloid which has valuable biological properties.

It has surprisingly been found that from species of the genus Conopharyngia (Apocynaceae) in particular from *Conopharyngia durissima* Stapf, a new isoquinuclidine alkaloid can be isolated. This is done by extracting parts of these plants, in particular the root and stem bark, with a low molecular alkanol, e.g. methanol or ethanol and, after concentrating the extract, distributing it between an acid aqueous phase, and an organic solvent which is not miscible with water, depriving the organic phase of acidic components by treatment with an aqueous phase having an alkaline reaction, then adsorbing the residue of the organic phase on an adsorbing agent and eluting the new isoquinuclidine alkaloid of the composition $C_{23}H_{30}N_2O_4$. On using aluminium oxide of activity I as adsorbing agent, the alkaloid is found in the benzene fractions and it crystallises from methanol in stout polyhedra which melt at 141–143°, $[\alpha]_D^{25} = -40.5°$ (in chloroform), $\lambda_{max}$ 224.5 m$\mu$ (log $\epsilon$=4.47), $\lambda_{max}$ 304 m$\mu$ (log $\epsilon$=4.05). The maxima of the UV spectra agree completely with those given by Neuss, Boaz and Forbes, J. Am. Chem. Soc. 76, 2464 for 2.3-dimethyl-5.6-dimethoxy indole: 227 m$\mu$ (log $\epsilon$=4.41) and 304 m$\mu$ (log $\epsilon$=3.92). On the other hand, the chemical reactions of the new substance, for example decarbomethoxylation by alkaline hydrolysis and heating with acids, or treatment with hydrazine hydrate in one step, agree completely with those of coronaridine and other isoquinuclidine alkaloids isolated from the sub-tribe Tabernaemontanae of the family Apocyanacea. Therefore, the new substance isolated according to the invention very probably has the following constitution:

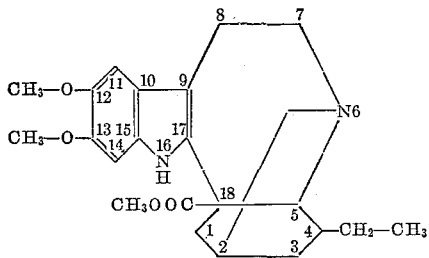

In accordance with this assumption, the new substance will be termed in the following as 12.13-dimethoxycoronaridine. It has analgesic activity and also a stimulating action on the central nervous system; on the other hand it also has a catatonic action. In addition, it potentiates the action of analgesics such as morphine and aminopyrine and it also potentiates the catatonia-producing action of bulbocapnine. It can be used therefore to correct mental and psychomotor disturbances.

The new isoquinuclidine alkaloid can be isolated according to the invention, for example, by (a) extracting parts of plants of the genus Conopharyngia, particularly the root and stem bark of *Conopharyngia durissima* Stapf, with an alkanol of 1–3 carbon atoms, particularly with methanol, or with ethanol or propanol and concentrating the extract, (b) stirring the concentrated extract into an 1–3 N aqueous solution of an alkanoic acid of 1–3 carbon atoms, preferably acetic acid, or formic acid or propionic acid, (c) removing the solids which have separated, e.g. by filtration, centrifugation or decantation, (d) defatting the clear solution by extraction with low molecular weight alkanes, preferably petroleum ether and then extracting said clear solution with a chlorinated aliphatic hydrocarbon of B.P. between 35 and 100° C., preferably with chloroform or methylene chloride, or with ethylene dichloride, trichlorethane, trichloroethylene or dichloroethylene, (e) evaporating the extract and dissolving the residue in an aqueous solution of an alkanoic acid of 1–3 carbon atoms, preferably in 1–3 N acetic acid, (f) basifying the acid solution with a base, e.g. conc. ammonia, sodium carbonate, potassium carbonate, sodium hydroxide or potassium hydroxide, (g) extracting with a solvent boiling below 120° C., such as a lower aliphatic ether, particularly diethyl ether or dipropyl ether, an ester, such as ethyl acetate, ethyl propionate, propyl acetate or isopropyl acetate, an aromatic hydrocarbon, such as toluene or, preferably, benzene or a chlorinated aliphatic hydrocarbon of B.P. between 35 and 100° C., preferably with chloroform or methylene chloride, or with ethylene dichloride, trichlorethane, trichloroethylene or dichloroethylene, (h) adsorbing the concentrated extract on aluminium oxide of activity I according to Brockmann, (i) eluting the isoquinuclidine alkaloid with benzene and (k) crystallising it from an alkanol having 1–3 carbon atoms, preferably from methanol, or from a mixture of diethyl ether and petroleum ether.

A further, advantageous modification of the process according to the invention consists in (1) bringing the pH of the filtered, aqueous alkanoic acid, preferably acetic acid, solution obtained after step (c) hereinabove described to a value of 6–12, preferably 8–10, by the addition of a base e.g. ammonia, sodium carbonate, potassium carbonate, sodium hydroxide or potassium hydroxide, (2) extracting with a solvent immiscible with water, such as benzene, diethyl ether, dipropylether, ethyl acetate, propylacetate or isopropylacetate, (3) depriving the organic phase of its basic constituents by extraction with dilute aqueous acid, e.g. 1–2 N hydrochloric acid or sulfuric acid, and rejecting the organic phase, (4) adjusting the pH value of the aqueous acid phase to a value of between 7 and 12, preferably to a value between 8 and 10, by addition of a base as mentioned above such as ammonia, (5) filtering off the resulting precipitate, (6) subjecting it to countercurrent distribution between an aqueous buffer according to McIlvaine having a pH value of 2.8–2.4, preferably and advantageously of 3.1±0.1 and an organic phase immiscible with water, for example and preferably with benzene, diethyl ether or mixtures thereof, (7) collecting the new isoquinuclidine alkaloid from the corresponding fractions, which are located near the centre of the distribution curve, and crystallising it from an alkanol of 1–3 carbon atoms, preferably from methanol.

Through experience it has been learned that the composition of the precipitate collected in step (5) hereinabove described may vary greatly with respect to the presence of undesired contaminations, the relative amount of which largely depends on the origin of the plant material used. Where the relative concentration of the desired new isoquinuclidine alkaloid in said precipitate is adversely influenced by the presence of such contaminants it is desirable to further purify said precipitate by (i) dissolving it in a dilute lower alkanoic acid, advantageously 1-2 N acetic acid, (ii) saturating the solution so obtained with an alkali halide, preferably sodium bromide or iodide or potassium bromide or iodide, (iii) removing any resulting precipitate by filtration, decantation or centrifugation, (iv) basifying the remaining clear solution, for example with ammonia, sodium or potassium carbonate, or sodium or potassium hydroxide, (v) collecting the resulting precipitate, for example by filtration, subjecting it to countercurrent distribution as described in step (6) detailed above, collecting the new isoquinuclidine alkaloid and crystallising it.

Other species of Conopharyngia which can be used for obtaining 12.13-dimethoxy-coronaridine are: *C. brachyantha, C. pachysiphon, C. chippii, C. crassa, C. cumminsii, C. jollyana, C. longiflora, C. penduliflora, C. angolensis, C. elegans, C. holstii, C. johnstonii* and *C. usambarensis*.

The following examples further illustrate the process according to the invention without limiting the invention in any way. Parts are given therein as parts by weight and their relationship to parts by volume is as grammes to cubic centimetres. The temperatures are in degrees centigrade.

*Example 1*

2800 parts of ground bark of *Conopharyngia durissima* Stapf (Apocynaceae) are percolated with 20,000 to 25,000 parts by volume of methanol and the extract, concentrated to about 1000 parts by volume, is stirred into 3000 parts by volume of 10% acetic acid. The solution is decanted from resins which have separated out, defatted by extraction with petroleum ether, and extracted in five portions with 10,000 parts by volume of chloroform. The evaporation residue of the chloroform extract is taken up in 1000 parts by volume of 10% acetic acid, the acetic acid solution is filtered if necessary, brought to a pH of 10–12 by adding ammonia and extracted with benzene. The residue of the benzene extract (7.5 parts by weight) is chromatographed through a column containing 225 parts by weight of aluminium oxide of activity I. After developing the chromatogram with 3000 parts by volume of benzene/petroleum ether (ratio 1:1), first about 0.5 part of a substance which melts at 155–156° (crystallised from methanol in the form of needles) is eluted with benzene (1000 parts by volume). The further benzene fractions contain 1–1.5 parts of 12.13-dimethoxy-coronaridine: $C_{23}H_{30}N_2O_4$, crystallised from methanol as solid polyhedra, M.P. 141–143°, $[\alpha]_D^{25} = -40.5°$ (in chloroform), $\lambda_{max}$ 224.5 m$\mu$ (log $\epsilon$=4.47), $\lambda_{max}$ 304 m$\mu$ (log $\epsilon$=4.05).

*Example 2*

5000 parts of ground bark of *Conopharyngia durissima* Stapf are macerated twice with 20,000 parts by volume of methanol, centrifuged, and the combined extracts concentrated in vacuo to 2,000 parts by volume, stirred into 3,000 parts by volume of acetic acid (10%), the remaining methanol is removed in vacuo, and the resulting aqueous acetic acid solution is clarified by decantation from precipitated gums. The remaining clear solution is rendered alkaline with ammonia and then extracted twice with 1,500 parts by volume of benzene. The combined benzene extracts are in turn extracted twice with 1000 parts of 2 N sulphuric acid, the combined aqueous phases are basified with ammonia and extracted twice with 1000 parts by volume of ether. The combined ether extracts are evaporated to dryness and the residue (26 parts) is subjected to countercurrent distribution (citric acid/phosphate buffer of pH 3.0; benzene/ether (1:1); 260 parts by volume each, 26 transfers). On completion of this operation each fraction is rendered alkaline with ammonia, agitated again, separated in phases, and the organic phases are evaporated separately. The evaporation residues of fractions 5–13 are combined and crystallised from methanol giving 12.13-dimethoxy coronaridine (3.1 parts) of M.P. 141–143°.

Instead of methanol, a mixture of ether and petroleum ether may be used for the crystallisation. Instead of ether, ethyl acetate or benzene may be used in an analogous manner for the extraction of the combined basified aqueous phases.

*Example 3*

3,100 parts of ground bark of *Conopharyngia durissima* Stapf are extracted with 30,000 parts by volume of methanol, the extract is concentrated in vacuo to 1000 parts by volume and the precipitating solids are removed by filtration. The resulting clear solution is stirred into 1500 parts by volume of 2 N acetic acid. The remaining methanol still contained in the solution is removed in vacuo and the resin separated during this operation is removed by decantation. The clarified solution is basified with ammonia and extracted twice with 750 parts by volume of benzene. Instead of ammonia, sodium hydroxide or potassium hydroxide may be used for basifying. The combined benzene phases are extracted twice with 500 parts by volume of 2 N sulphuric acid, the phases are separated, the bases contained in the aqueous phase are precipitated by the addition of ammonia and filtered off. The residue (A) (about 3 parts) is dissolved in 30 parts by volume of acetic acid (10%) and 30 parts by volume of a saturated aqueous solution of potassium bromide is added, the resulting precipitate is filtered off and the filtrate is set aside. The filter cake is dissolved with warming in 20 parts by volume of acetic acid (5%), 20 parts by volume of saturated potassium bromide solution are added, and the precipitate is removed by filtration. The combined filtrates are basified with ammonia and the precipitate (1.5 parts) filtered off. It is subjected to countercurrent distribution at a pH of 3.2 as set forth in Example 2 and 12,13-dimethoxy-coronaridine (0.15 part) isolated from fractions 7–16 and crystallised from methanol, M.P. 141–143°.

Direct purification of the residue (A) by countercurrent distribution as described above gave a yield of only 0.08 part of 12,13-dimethoxycoronaridine.

What we claim is:

1. Process for the obtention of isoquinuclidine alkaloid from plants of the genus Conopharyngia comprising (a) extracting the root and stem bark of *Conopharyngia durissima* Stapf, with alkanol of 1–3 carbon atoms and concentrating the extract, (b) stirring the concentrated extract into an aqueous solution of alkanoic acid of 1–3 carbon atoms, the aqueous solution having a normality of between 1 and 3, (c) removing the solids which have separated, (d) defatting the clear solution with petroleum ether and then extracting it with chlorinated lower alkane, (e) evaporating the extract and dissolving the residue in 1–3 N acetic acid, (f) basifying the acetic acid solution with a base selected from the group consisting of ammonia, sodium carbonate, potassium carbonate, sodium hydroxide and potassium hydroxide, (g) extracting with aromatic hydrocarbon boiling below 120°, (h) adsorbing the extract on aluminium oxide of activity I, (i) eluting adsorbed isoquinuclidine alkaloid with benzene and (k) crystallising it from alkanol with 1–3 carbon atoms.

2. Process for the obtention of isoquinuclidine alkaloid comprising (a) extracting the root and stem bark of a member of the genus Conopharyngia selected from the group consisting of *C. brachyantha, C. pachysiphon, C. chippii, C. crassa, C. cumminsii, C. jollyana, C. longiflora, C. penduliflora, C. angolensis, C. elegans, C. holstii, C. johnstonii, C. usambarensis* and *C. durissima* Stapf with alkanol of 1–3 carbon atoms and concentrating the extract, (b) stirring the concentrated extract into an aqueous solution of alkanoic acid of 1–3 carbon atoms, the aqueous solution having a normality of between 1 and 3, (c) removing the solids which have separated and basifying the resultant clear aqueous acid solution with a base selected from the group consisting of ammonia, sodium carbonate, potassium carbonate, sodium hydroxide and potassium hydroxide, to a pH value of 8–10, (d) extracting with a solvent boiling below 120° C. selected from the group consisting of di(lower alkyl)-ether, lower alkanoic acid lower alkyl ester and monocyclic aromatic hydrocarbon, (e) depriving the organic phase of basic constituents by treatment with 1–3 N mineral acid selected from the group consisting of hydrochloric acid and sulfuric acid, (f) basifying the aqueous phase with a base selected from the group consisting of ammonia, sodium carbonate, potassium carbonate, sodium hydroxide and potassium hydroxide, to a pH value of 8–10, (g) collecting the precipitate, (h) subjecting it to countercurrent distribution between an aqueous buffer having a pH value between 3.0 and 3.2, and an organic phase consisting of a mixture of benzene and diethyl ether, (i) collecting said isoquinuclidine alkaloid from the fractions located near the center of the distribution curve, and (j) crystallising it from an alkanol of 1–3 carbon atoms.

3. Process for the obtention of isoquinuclidine alkaloid comprising (a) extracting the root and stem bark of a member of the genus Conopharyngia selected from the group consisting of C. brachyantha, C. pachysiphon, C. chippii, C. crassa, C. cumminsii, C. jollyana, C. longiflora, C. penduliflora, C. angolensis, C. elegans, C. holstii, C. johnstonii, C. usambarensis and C. durissima Stapf with alkanol of 1–3 carbon atoms and concentrating the extract into an aqueous solution of alkanoic acid of 1–3 carbon atoms, the aqueous solution having a normality of between 1 and 3, (c) removing the solids which have separated and basifying the resultant clear aqueous acid solution with a base selected from the group consisting of ammonia, sodium carbonate, potassium carbonate, sodium hydroxide and potassium hydroxide, to a pH value of 8–10, (d) extracting with a solvent boiling below 120° C. selected from the group consisting of di(lower alkyl)-ether, lower alkanoic acid lower alkyl ester and monocyclic aromatic hydrocarbon, (e) depriving the organic phase of basic constituents by treatment with 1–3 N mineral acid selected from the group consisting of hydrochloric acid and sulfuric acid (f) basifying the aqueous phase with a base selected from the group consisting of ammonia, sodium carbonate, potassium carbonate, sodium hydroxide and potassium hydroxide, to a pH value of 8–10, (g) collecting the precipitate, (h) dissolving said precipitate in 1–3 N lower alkanoic acid of 1–3 carbon atoms, (i) saturating the solution with alkali halide selected from the group consisting of sodium bromide, sodium iodide, potassium bromide and potassium iodide, (j) removing any precipitate formed, (k) basifying the clear solution with base selected from the group consisting of ammonia, sodium carbonate, potassium carbonate, sodium hydroxide and potassium hydroxide, (l) collecting the precipitate, (m) subjecting it to countercurrent distribution between an aqueous buffer having a pH value between 3.0 and 3.2, and an organic phase consisting of a mixture of benzene and diethyl ether, (n) collecting said isoquinuclidine alkaloid from the fractions located near the center of the distribution curve and (o) crystallising it from alkanol of 1–3 carbon atoms.

4. Process for the obtention of a new isoquinuclidine alkaloid comprising (a) extracting the root and stem bark of Conopharyngia durissima Stapf with methanol and concentrating the extract, (b) stirring the concentrated extract into an aqueous solution of 2 N acetic acid, (c) removing the solids which have separated, (d) de-fatting the clear solution with petroleum ether and then extracting it with chloroform, (e) evaporating the extract and dissolving the residue in 2 N acetic acid, (f) basifying the acetic acid solution with ammonia, (g) extracting with benzene, (h) adsorbing the extract on aluminium oxide of activity I, (i) eluting the new isoquinuclidine alkaloid with benzene and (k) crystallising it from methanol.

5. Process for the obtention of a new isoquinuclidine alkaloid comprising (a) extracting the root and stem bark of Conopharyngia durissima Stapf with methanol and concentrating the extract, (b) treating the concentrated extract with 2 N acetic acid solution, (c) removing the solids which have separated, (d) basifying the clear aqueous acid solution with ammonia to a pH value of 8–10, (e) extracting with benzene, (f) depriving the organic phase of basic constituents by treatment with 2 N sulphuric acid, (g) basifying the aqueous phase with ammonia to a pH value of 8–10, (h) collecting the precipitate, (i) subjecting it to countercurrent distribution between an aqueous citrate/phosphate buffer having a pH value between 3.0 and 3.2 and an organic phase consisting of a mixture of benzene and diethyl ether in the ratio of 1:1, (k) collecting the new isoquinuclidine alkaloid from the fractions located near the centre of the distribution curve and (l) crystallising it from methanol.

6. Process for the obtention of a new isoquinuclidine alkaloid comprising (a) extracting the root and stem bark of Conopharyngia durissima Stapf with methanol and concentrating the extract, (b) treating the concentrated extract with 2 N acetic acid solution, (c) removing the solids which have separated, (d) basifying the clear aqueous acid solution obtained with ammonia to a pH value of 8–10, (e) extracting with benzene, (f) depriving the organic phase of basic constituents by treatment with 2 N sulphuric acid, (g) basifying the aqueous phase with ammonia, (h) collecting the precipitate, (i) dissolving the precipitate in 2 N acetic acid, (k) saturating the solution with potassium bromide, (l) removing any precipitate formed, (m) basifying the clear solution with amonia, (n) collecting the precipitate, (o) subjecting it to countercurrent distribution between an aqueous citrate/phosphate buffer having a pH value between 3.0 and 3.2 and an organic phase consisting of a mixture of benzene and diethyl ether (ratio 1:1), (p) collecting the new isoquinuclidine alkaloid from the fractions located near the centre of the distribution curve and (q) crystallising it from methanol.

7. The crystalline isoquinuclidine alkaloid 12.13-dimethoxy coronaridine of the formula $C_{23}H_{30}N_2O_4$, having a melting point of 141–143° C. crystallised from methanol and a specific rotation of $[\alpha]_D^{25}$ —40.5° (in chloroform) $\lambda_{max}$ 224.5 m$\mu$ (log $\epsilon$=4.47), $\lambda_{max}$ 304 m$\mu$ (log $\epsilon$=4.05).

References Cited in the file of this patent
UNITED STATES PATENTS

| | | |
|---|---|---|
| 2,823,204 | Janot et al. | Feb. 11, 1958 |
| 2,866,784 | Gillo et al. | Dec. 30, 1958 |
| 2,945,851 | Renner | July 19, 1960 |

OTHER REFERENCES

Willaman et al., "Economic Botany," volume 9, No. 2, pages 141–150.

Willaman et al., "Amer. Jour. Pharm.," volume 129, pages 246–256 (1957).

Bartlett et al., "J. Am. Chem. Soc.," volume 80, pages 126–136 (1958).